(12) United States Patent
Perless et al.

(10) Patent No.: US 11,577,603 B2
(45) Date of Patent: Feb. 14, 2023

(54) METHOD FOR ADAPTING A FUEL QUANTITY TO BE INJECTED IN AN INTERNAL COMBUSTION ENGINE

(71) Applicant: Robert Bosch GmbH, Stuttgart (DE)

(72) Inventors: Alexander Perless, Vaihingen an der Enz (DE); Cam Lai Ngo, Stuttgart (DE); Guido Schock, Loewenstein (DE); Holger Jessen, Ludwigsburg (DE); Juergen Geier, Hessigheim (DE); Martin Schaefer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 16/807,326

(22) Filed: Mar. 3, 2020

(65) Prior Publication Data
US 2020/0290453 A1 Sep. 17, 2020

(30) Foreign Application Priority Data
Mar. 13, 2019 (DE) .......................... 102019203409.8

(51) Int. Cl.
*B60K 15/03* (2006.01)
*B60K 15/035* (2006.01)
(Continued)

(52) U.S. Cl.
CPC ........ *B60K 15/035* (2013.01); *F02D 41/0042* (2013.01); *F02M 25/0836* (2013.01); *B60K 2015/0358* (2013.01)

(58) Field of Classification Search
CPC .............. F02M 25/0836; B60K 15/035; B60K 2015/0358; F02D 41/003; F02D 41/0042;
(Continued)

(56) References Cited

U.S. PATENT DOCUMENTS 4,705,007 A * 11/1987 Plapp ................... F02M 25/089
123/519
5,372,117 A * 12/1994 Denz ..................... F02D 41/004
123/520
(Continued)

FOREIGN PATENT DOCUMENTS

DE 102011006587 A1 10/2012

*Primary Examiner* — Phutthiwat Wongwian
*Assistant Examiner* — Diem T Tran
(74) *Attorney, Agent, or Firm* — Norton Rose Fulbright US LLP; Gerard Messina

(57) ABSTRACT

A method for operating an internal combustion engine. The method includes: operating the internal combustion engine including a lambda regulation, which sets a fuel quantity to be supplied in accordance with a predefined setpoint lambda value, at preset times, carrying out a filter cleaning operation for a fuel tank ventilation, as a function of the presence of a release condition of the internal combustion engine, carrying out an adaptation of the lambda regulation by adapting at least one adaptation parameter as a function of operating variables of the internal combustion engine, at active filter cleaning operation and upon the presence of the release condition, operating variables which are required to carry out the adaptation of the lambda regulation being recorded, at deactivated filter cleaning operation and presence of the release condition, the adaptation of the lambda regulation being carried out as a function of the recorded operating variables.

8 Claims, 2 Drawing Sheets

(51) Int. Cl.
*F02M 25/08* (2006.01)
*F02D 41/00* (2006.01)
(58) Field of Classification Search
CPC ............. F02D 41/1454; F02D 41/2448; F02D 41/2464
See application file for complete search history.

(56) References Cited

U.S. PATENT DOCUMENTS

| | | | | |
|---|---|---|---|---|
| 5,386,812 | A * | 2/1995 | Curran | F02M 25/0809 |
| | | | | 123/520 |
| 5,560,243 | A * | 10/1996 | Wild | F02M 25/0809 |
| | | | | 73/114.39 |
| 2004/0231319 | A1 * | 11/2004 | Weirich | F02D 41/0032 |
| | | | | 60/274 |
| 2008/0161980 | A1 * | 7/2008 | Posselt | F02D 41/0032 |
| | | | | 701/1 |
| 2009/0044785 | A1 * | 2/2009 | Maly | F02M 25/0818 |
| | | | | 123/519 |

* cited by examiner

# METHOD FOR ADAPTING A FUEL QUANTITY TO BE INJECTED IN AN INTERNAL COMBUSTION ENGINE

CROSS REFERENCE

The present application claims the benefit under 35 U.S.C. § 119 of German Patent Application No. DE 102019203409.8 filed on Mar. 13, 2019, which is expressly incorporated herein by reference in its entirety.

FIELD

The present invention relates to internal combustion engines, and in particular methods for carrying out a mixture adaptation for a lambda regulation and a fuel tank ventilation.

BACKGROUND INFORMATION

For low-emission and efficient operation of a reciprocating piston internal combustion engine, a fuel-air ratio is specified thereto, which is generally characterized with the aid of a lambda value. The lambda value of 1 indicates that a stoichiometric balance exists between fuel and air in the combustion chamber of the cylinder of the internal combustion engine. The lambda value may be measured, for example, with the aid of an exhaust gas sensor in the exhaust gas discharge system after the combustion in the cylinder.

The fuel-air ratio has to be set for the operation of the internal combustion engine. For this purpose, a pilot control and a downstream regulation are typically provided in the scope of a lambda regulation. The pilot control provides a base setting of a fuel quantity to be injected depending on an engine load, an air charge in the cylinders, and a predefined setpoint lambda value in a defined manner. The regulation downstream from the pilot control is used to adjust the deviations between an actual lambda value, which results from the fuel quantity predefined by the pilot control and the predefined setpoint lambda value.

The behavior of the pilot control is generally adaptable within the scope of a mixture adaptation to compensate for changes of the behavior of the internal combustion engine, in particular due to signs of age.

A conventional mixture adaptation is described, for example, in German Patent Application No. DE 10 2011 006 587 A1. A method for mixture adaptation of a pilot control for the setting of a fuel-air mixture for an internal combustion engine is described therein. The pilot control sets a fuel quantity as a function of an air quantity via an adaptable parameterizable relationship. During an adaptation procedure, a present measuring point is determined from an air quantity and a fuel quantity, at which a predefined lambda is achieved. The present operating range, in which the measuring point is located, is determined, and the deviation of the measuring point from the operating point located in the present operating range is determined. A corrected operating point between the operating point and the measuring point is determined, and corrected parameters of a parameterized relationship are determined from the corrected operating point and the operating points not located in the present operating range, as well as parameter values of the preceding adaptation step.

Furthermore, an engine system in an internal combustion engine includes a fuel tank ventilation, which enables a supply of ambient air into the fuel tank to carry out a pressure equalization. The fuel tank ventilation includes an activated carbon filter to prevent an escape of gaseous hydrocarbon into the surroundings. The activated carbon filter has to be flushed using ambient air at time intervals in a filter cleaning operation. For this purpose, a partial vacuum in the intake manifold is used to suction ambient air into the intake manifold through the activated carbon filter. The introduction of additional fuel vapor into the intake manifold causes a change of the fuel-air mixture in the cylinders, so that a compensation takes place via an intervention in the fuel quantity to be injected. The present loading of the activated carbon filter with hydrocarbon may be learned and the compensation of the fuel quantity may be determined via the resulting deviation of the measured lambda value from the setpoint lambda value set by the lambda regulation.

Both procedures, the mixture adaptation and the filter cleaning operation, are therefore based on the same physical input variable, the measured lambda value. Parallelization of both procedures is therefore not readily possible, since otherwise the adaptation values determined by the mixture adaptation would be corrupted. To prevent a breakthrough of the activated carbon filter, the filter cleaning operation moreover requires a sufficiently long flushing time. It is therefore not available to the mixture adaptation, so that the adaptation has to be carried out from a reduced database.

SUMMARY

According to the present invention, an example method for carrying out a mixture adaptation for an internal combustion engine, an example device, and an example engine system are provided.

Further embodiments of the present invention are described herein.

According to a first aspect of the present invention, an example method is provided for operating an internal combustion engine including a lambda regulation and a fuel tank ventilation, including the following steps:
 operating the internal combustion engine using a lambda regulation, which includes an adaptable pilot control and a downstream regulation and is designed to set a fuel quantity to be supplied in accordance with a predefined setpoint lambda value;
 at preset times, carrying out a filter cleaning operation for a fuel tank ventilation,
 as a function of the presence of a release condition of the internal combustion engine, carrying out an adaptation of the lambda regulation by adapting at least one adaptation parameter as a function of operating variables of the internal combustion engine;
 with active filter cleaning operation and upon the presence of the release condition, operating variables which are required to carry out the adaptation of the lambda regulation being recorded, with deactivated filter cleaning operation and presence of the release condition, the adaptation of the lambda regulation being carried out as a function of the recorded operating variables.

The above-mentioned method provides also for collecting further adaptation values during the filter cleaning operation phases. Fuel vapor has entered the intake manifold due to the filter cleaning operation and thus changes the fuel-air ratio set by the mixture setting. The mixture setting is carried out by a lambda regulation and provides an adaptable pilot control and a downstream regulation to set the fuel-air ratio to a desired setpoint lambda value, which may be predefined by an engine management system.

If a mixture adaptation method is carried out during an activated filter cleaning operation, inaccuracies in the adaptation values are thus accepted. Therefore, the operating variables which are required for carrying out the mixture adaptation are recorded during the active filter cleaning operation, without a corresponding adaptation of adaptation parameters actually taking place. The adaptation parameters of the mixture adaptation are first updated, based on the detected operating variables, after deactivation of the filter cleaning operation and with active mixture adaptation.

In the above procedure, it is presumed that the influence of the active filter cleaning operation averages out over the statistical breadth, since a large bandwidth of possible operating points are taken in the course of a trip at different flushing rates of the filter cleaning operation. This is because of, on the one hand, the continuously changing loading of the activated carbon filter of the fuel tank ventilation, and, on the other hand, also of the driving profile and the varying pressure gradient resulting therefrom between surroundings and intake manifold, which is used for flushing the activated carbon filter, however.

Due to the procedure, operating variables resulting during the active filter cleaning operation are detected and used without being immediately incorporated into a change of adaptation values. Errors introduced due to the filter cleaning operation average out by longer duration of the filter cleaning operation, whereby the database for the mixture adaptation may also be significantly increased by also carrying out the usage of the mixture adaptation during the active filter cleaning operation.

In phases in which the filter cleaning operation is not active, the mixture adaptation may be carried out in the previous manner in the case of a suitable operating point.

If the filter cleaning operation is inactive and there is no suitable operating point for carrying out the mixture adaptation, the operating variables which have been collected during the operation with active filter cleaning operation may be used for updating the adaptation parameters. Due to this quasi-parallelization of the mixture adaptation and the filter cleaning operation, it is possible to carry out the mixture adaptation using a larger database and thus to make it more stable with respect to temporary mixture deviations.

It may be provided that the release condition exists when the internal combustion engine is operated in a predetermined operating range.

Furthermore, carrying out an adaptation of the lambda regulation may be suppressed for a predetermined waiting time after activation of the filter cleaning operation, in particular if a change of the operating point is recognized after the activation of the filter cleaning operation. This is used to enable an engagement of the filter cleaning operation, so that the loading factor may be ascertained.

According to one specific embodiment of the present invention, the operating variables which are recorded for adaptation of the lambda regulation may include the engine speed and/or the engine load, the measured lambda value, the setpoint lambda value, a specification of the air charge in the internal combustion engine, and the supplied fuel quantity.

It may be provided that at least one adaptation parameter is adapted as a function of operating variables of the internal combustion engine to carry out an adaptation of the lambda regulation.

Furthermore, a loading factor of an activated carbon filter of the fuel tank ventilation may be ascertained during the filter cleaning operation from a deviation of a measured lambda value from the predefined setpoint lambda value, the loading factor being taken into consideration for the correction of the fuel quantity to be supplied.

It may be provided that an integration portion of the lambda regulation is exclusively used to ascertain a loading factor during the filter cleaning operation.

According to a further aspect of the present invention, an example device, in particular an engine control unit, is provided for operating an internal combustion engine including a lambda regulation and a fuel tank ventilation, the device being designed to:
 operate the internal combustion engine including a lambda regulation which is designed to set a fuel quantity to be supplied in accordance with a predefined setpoint lambda value,
 carry out a filter cleaning operation for a fuel tank ventilation at preset times,
 as a function of the presence of a release condition of the internal combustion engine, carry out an adaptation of the lambda regulation by adapting at least one adaptation parameter as a function of operating variables of the internal combustion engine;
 with active filter cleaning operation and upon the presence of the release condition, operating variables which are required to carry out the adaptation of the lambda regulation being recorded, with deactivated filter cleaning operation and presence of the release condition, the adaptation of the lambda regulation being carried out as a function of the recorded operating variables.

BRIEF DESCRIPTION OF THE DRAWINGS

Specific embodiments are explained in greater detail hereafter with reference to the figures.

DETAILED DESCRIPTION OF EXAMPLE EMBODIMENTS

Figure 1:
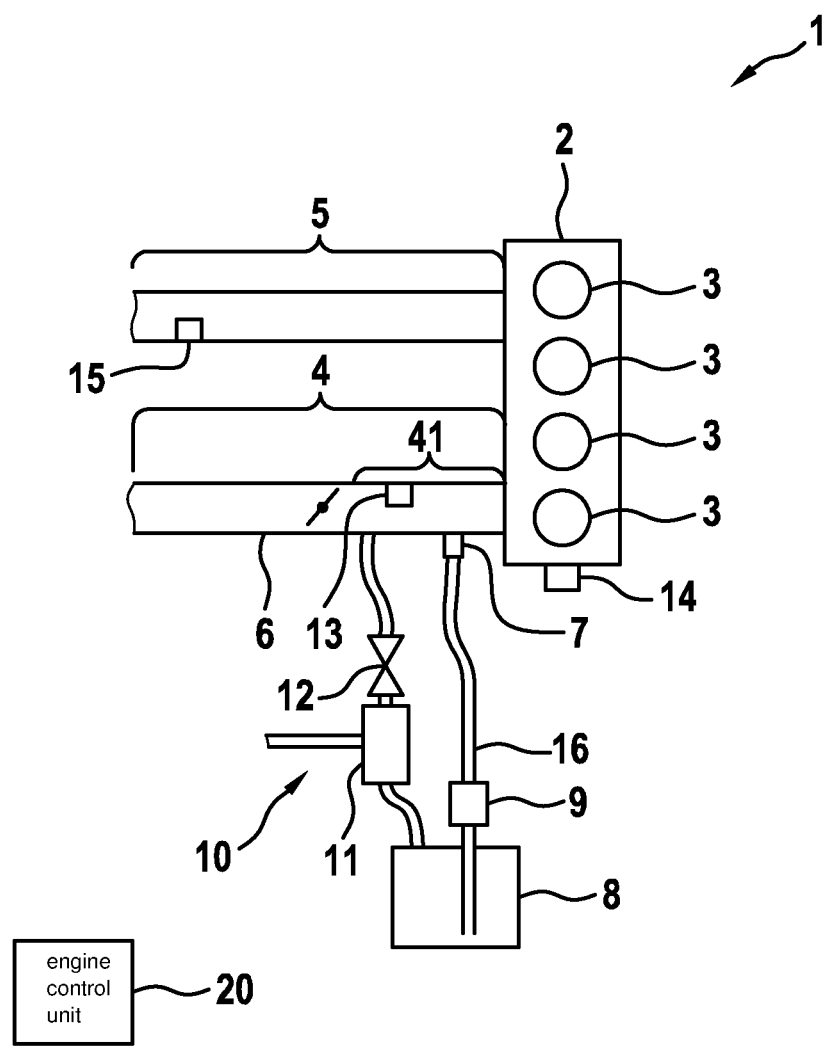
FIG. 1 shows a schematic illustration of an engine system including an internal combustion engine.

FIG. 1 shows a schematic illustration of an engine system 1 including an internal combustion engine 2. Internal combustion engine 2 is designed, for example, as an air-supplied internal combustion engine, for example, as a gasoline engine. Internal combustion engine 2 includes a number of cylinders, in the present exemplary embodiment four cylinders 3, to which ambient air is supplied via an air supply system 4 and from which combustion exhaust gases are discharged via an exhaust gas discharge system 5.

A throttle valve 6 is situated in air supply system 4 to be able to set an amount of an oxygen supply into cylinders 3 of internal combustion engine 2. Throttle valve 6 is used to set an intake manifold pressure in an intake manifold section 41 of air supply system 4. Fuel may be supplied to internal combustion engine 2 by injection into an intake manifold section 41 or by direct injection with the aid of injectors into the combustion chambers of cylinders 3. In the exemplary embodiment described hereafter, an intake manifold injection of fuel is presumed. For this purpose, an injector 7 is situated in intake manifold section 41 of air supply system 4 which is provided between throttle valve 6 and inlet valves into cylinders 2.

Injector 7 is connected via a fuel line 16 to a fuel tank 8. In addition, a fuel pump 9 is provided to convey fuel from fuel tank 8 to injector 7.

Engine system 1 may furthermore be provided with an exhaust gas recirculation and/or with a charging unit, in particular in the form of a turbocharger (both not shown).

An exhaust gas sensor 15 is provided in exhaust gas discharge system 5 to detect an oxygen content of the combustion exhaust gas. In particular, exhaust gas sensor 15 may be designed as a lambda sensor.

Furthermore, a fuel tank ventilation 10 is provided, which provides a pipe connection from an upper side of fuel tank 8 through an activated carbon filter 11 into intake manifold section 41. On the one hand, activated carbon filter 11 enables a pressure equalization in fuel tank 8 and, on the other hand, it prevents fuel vapors from the interior of fuel tank 8 from being able to reach the surroundings.

Activated carbon filter 11 is filled with vaporized fuel in the course of time and has to be flushed at certain time intervals for a longer flushing duration in each case in order to avoid a breakthrough, i.e., fresh air is conducted through activated carbon filter 11 to discharge the fuel stored therein. The flushing procedure of activated carbon filter 11 is carried out based on the pressure difference between the surroundings and intake manifold section 41 and is activated by opening a tank ventilation valve 12, which opens the air flow path from the surroundings through activated carbon filter 11 into intake manifold section 41.

Furthermore, an engine control unit 20 is provided, which controls the operation of the engine system. For this purpose, engine control unit 20 may be connected to actuators of engine system 1, for example, throttle valve 6 and injector 7, to activate them in accordance with a an input variable, for example, a setpoint engine torque, and other state variables of engine system 1. The state variables are provided via suitable sensors, for example, an intake manifold pressure sensor 13, a speed sensor 14, and exhaust gas sensor 15 for detecting a lambda value.

In addition to functions for operating internal combustion engine 2, engine control unit 20 executes a method for lambda regulation. For this purpose, a setpoint lambda value, which specifies a desired fuel-air ratio, is set by predefining the fuel quantity to be injected. Predefining the fuel quantity to be injected is carried out by the lambda regulation with the aid of a pilot control and a downstream regulation.

The pilot control is carried out by predefining a setpoint lambda value from the engine control and by associating one or several operating point variables, for example, an engine speed, an engine load, or the like, and an air charge in cylinders 3, which may be determined in particular by the engine speed and the intake manifold pressure, according to a characteristic map or association function stored in engine control unit 20. The pilot control thus assigns a fuel quantity which, after it is mixed with the oxygen of the supplied fresh air results in a fuel-air mixture having a fuel-air ratio, which is to correspond to the predefined setpoint lambda value.

The regulation compensates for the deviations remaining after the pilot control between a fuel quantity predefined by the pilot control and an actually required fuel quantity, in particular permanent deviations, for example, due to aging of engine system 1 or short-term deviations due to dynamic operating states of internal combustion engine 2.

To compensate for permanent deviations, the association function is modified by adaptation parameters, which are regularly adapted with the aid of a mixture adaptation. The adaptation may take place by applying a multiplicative adaptation factor to the fuel quantity to be injected and/or an additive adaptation offset over the entire operating range or separately for individual operating ranges. The mixture adaptation is essentially carried out by comparing an actual fuel-air ratio ascertained by exhaust gas sensor 15 and the injected fuel quantity at ascertained air charge, the injected fuel quantity being ascertained from a predefined fuel-air ratio. This may be determined by comparison of the predefined fuel-air ratio to the actually measured fuel-air ratio in a conventional way, for example, as described in above-mentioned German Patent Application No. DE 10 2001 006 587 A1.

The adaptation may be carried out in a closed-loop operation, i.e., deviations between an actual fuel-air ratio and a set fuel-air ratio are taken into consideration directly in the adaptation parameters. In an open-loop operation, deviations between the actual fuel-air ratio and the set fuel-air ratio are solely recorded as a function of the operating point and are only evaluated at a later point in time.

Engine control unit 20 also controls a filter cleaning operation. The fuel tank ventilation operates essentially passively and ensures with the aid of activated carbon filter 11 that fuel vapors do not reach the surroundings. Due to the limited absorbing capacity of activated carbon filter 11 for fuel, it has to be flushed at regular time intervals for a longer time in the filter cleaning operation, i.e., flooded with fresh air to discharge the fuel vapors stored therein. The discharge of the fuel vapors takes place into intake manifold section 41, and the flushing of activated carbon filter 11 is based on a pressure difference between the surroundings and intake manifold section 41.

Due to the varying pressure difference via activated carbon filter 11 due to the intake manifold pressure, which continuously changes depending on the operating state of internal combustion engine 2, and the differing loading of activated carbon filter 11, the quantity of fuel introduced into intake manifold section 41 is undefined. A mixture adaptation performed during this thus results in errors, since the quantity of the injected fuel or fuel to be injected is supplemented by the quantity of the fuel supplied via the fuel tank ventilation. A mixture adaptation carried out during an active filter cleaning operation thus necessarily results in maladaptations.

Figure 2:
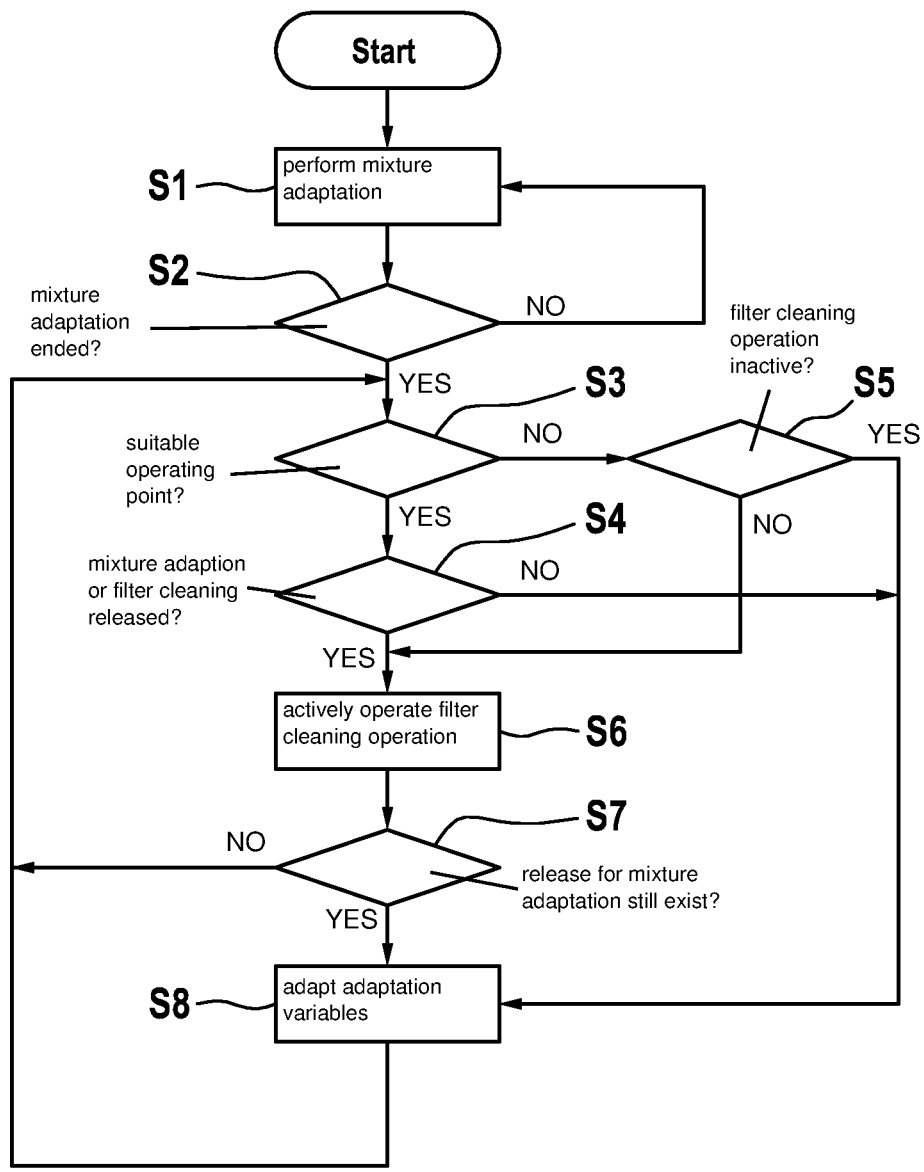
FIG. 2 shows a flow chart for carrying out a method for adapting a fuel-air mixture in conjunction with a fuel tank ventilation.

In the flow chart of FIG. 2, a method for operating a mixture adaptation in conjunction with a filter cleaning operation is described hereafter. The method may be carried out in a control unit, in particular in engine control unit 20, and implemented there as a software algorithm or hardware algorithm.

In step S1, a mixture adaptation is initially performed with deactivated filter cleaning operation, in particular during startup or before startup of engine system 1. The mixture adaptation takes place here in a conventional way, in particular by approaching various operating states of internal combustion engine 2.

In step S2, it is checked whether the initial mixture adaptation is ended. As long as the initial mixture adaptation is not ended, a filter cleaning operation is not permitted. If the initial mixture adaptation is completed (alternative: yes), initial adaptation parameters are provided in engine control unit 20, using which an injection quantity correction may be carried out in the pilot control. The injection quantity correction is carried out by applying a corresponding adaptation parameter multiplicatively and/or additively to the fuel quantity associated with the operating variables. The method is subsequently continued with step S3. Otherwise (alternative: no), the method jumps back to step S1.

In step S3, it is checked whether a suitable operating point exists for carrying out a mixture adaptation again. For example, the operating points may be low and moderate speed ranges, since in this case the influence of the mixture adaptation is particularly clearly recognizable and an adaptation may be carried out more accurately due to the higher sensitivity with respect to the adaptation parameters.

If a suitable operating point for carrying out a mixture adaptation exists (alternative: yes), the method is thus continued with step S4, otherwise (alternative: no), the method is continued with step S5.

In step S4, it is checked whether a mixture adaptation or a filter cleaning operation is released. This is carried out based on a predefined release signal, which is generated in engine control unit 20. If a release exists for the mixture adaptation or the filter cleaning operation (alternative: yes), the method is thus continued with step S6, otherwise (alternative: no), the method is continued with step S8.

In step S5, it is checked whether the filter cleaning operation is inactive. The filter cleaning operation is generally activated according to a preset time scheme, i.e., at predetermined time intervals and for certain time spans. If this is the case (alternative: yes), the method is also continued with step S8, otherwise (alternative: no), according to step S6, the filter cleaning operation is actively operated and operating variables are recorded which are required for the adaptation of the adaptation variables.

At the same time, the loading factor is adapted in step S6. At active filter cleaning operation, the fuel quantity which enters the combustion chamber is modeled. The injection quantity is accordingly reduced by this amount. A stoichiometric lambda is thus to exist. If this is not the case, the filter cleaning operation adapts a corresponding fuel tank ventilation model by increasing/reducing the loading value. This may be carried out continuously or regularly.

In particular, in step S6, at active mixture adaptation for various operating points, in which internal combustion engine 2 is operated, the fuel-air ratio to be set (setpoint lambda value), the injected fuel quantity, and the actual fuel-air ratio measured via exhaust gas sensor 15 are detected. These are collected as raw data and merely stored, without using them for a mixture adaptation, however.

In step S7, it is checked whether the release for the mixture adaptation still exists. If this is the case (alternative: yes), the method is continued with step S8, otherwise (alternative: no), the method jumps back to step S3.

In step S8, the adaptation variables are adapted based on the recorded operating variables and taken into consideration from then on in the mixture adaptation.

If the mixture adaptation is carried out in parallel to the filter cleaning operation, a stationary operating point may be assumed to ascertain the effects of the filter cleaning operation on the mixture adaptation. If the filter cleaning operation is active, the injection quantity is reduced by the fuel portion added from the filter cleaning operation, and the actually injected fuel quantity is available for the activation of the injectors. The relative fuel quantity is ascertained in this case from the mass flow of the filter cleaning operation into the intake manifold and the loading factor, which reflects the fuel portion in the gas mixture from activated carbon filter 11. The loading factor may be ascertained from the lambda regulation deviation by compensating for the I portion of the regulation. The mass flow into the intake manifold may be ascertained from the present duty cycle of tank ventilation valve 12 and the pressure gradient between ambient pressure and intake manifold pressure. Alternatively, instead of the modeling, the mass flow may also be measured.

Upon the initial opening of tank ventilation valve 12, a loading factor is thus not yet available, and it is therefore assumed that all of the fuel has to be provided via the injection. However, since a fuel portion reaches the combustion chamber via the fuel tank ventilation, the resulting fuel-air ratio is excessively rich, which results in a reaction of the lambda regulation. This is recognized by the tank ventilation adaptation of the filter cleaning operation and the loading factor is increased to correctly compute the relative fuel quantity from the filter cleaning operation. The loading factor may be completely adapted by this closed control loop according to a defined flushing quantity, i.e., time span of the active filter cleaning operation. A stationary state is thus achieved in spite of active filter cleaning operation, in which a stoichiometric fuel-air ratio exists and the lambda regulation does not have to carry out a further intervention.

In this substituted state, the mixture adaptation may be carried out in parallel to the filter cleaning operation without a fuel introduction caused by the filter cleaning operation resulting in an error. This stationary state is not applied permanently, however, but rather the loading factor from the filter cleaning operation changes continuously due to varying pressure differences between surroundings and intake manifold section and due to the decreasing loading of the activated carbon filter. However, the loading change is comparatively small, so that the error up to the re-adaptation of the loading factor is negligible.

In a system for the mixture adaptation of the relevant multiplicative adaptation parameters, the relationship between relative air quantity and relative fuel quantity represents a line through the origin having a slope not equal to 1. The goal of the mixture adaptation is to compensate for an error of the lambda regulation which results in an association with a slope not equal to 1, by a corresponding multiplicative adaptation parameter being determined. If the mixture adaptation is not carried out in parallel to the filter cleaning operation, conventionally, the value pairs of air quantity and fuel quantity are collected until sufficient data are present to carry out and adapt the adaptation parameters.

In particular, a straight-line computation may be carried out via a suitable interpolation method and the result may be indicated in the form of a multiplicative adaptation parameter. If the filter cleaning operation is carried out at the same time as the mixture adaptation, the tank ventilation adaptation attempts to take over the I portion of the lambda regulation. This means the I portion of the lambda regulation is exclusively interpreted as an influence of the fuel quantity additionally introduced by the filter cleaning operation.

The lambda regulation moreover reacts to the excessively rich mixture and reduces the intervention, and the tank ventilation adaptation learns the loading factor. In the resulting steady state, the lambda regulation factor would again be in a neutral position, and the loading factor of the filter cleaning operation would be set to the instantaneous loading of activated carbon filter 11 with fuel. However, the loading factor does not correspond in this procedure to the actual loading, but rather additionally also compensates for the already existing target adaptation of the lambda regulation, i.e., the mixture error.

In the steady state, the mixture adaptation no longer sees the correct error. However, if a shift of the operating point occurs upon this observation, the engine system has to oscillate again and the mixture adaptation again sees the resulting error during the transient phase. In particular, in the case of a parallelization of the filter cleaning operation and the mixture adaptation, it has to be ensured that the mixture adaptation may only recognize an error and adapt in the event of a change of the fuel tank ventilation influence.

What is claimed is:

1. A method for operating an internal combustion engine, comprising the following steps:
   operating the internal combustion engine including a lambda regulation, which sets a fuel quantity to be injected by an injector connected to a fuel tank via a fuel line in accordance with a predefined setpoint lambda value;
   at preset times, carrying out a filter cleaning operation for a fuel tank ventilation;
   as a function of the presence of a release condition of the internal combustion engine, carrying out an adaptation of the lambda regulation by adapting at least one adaptation parameter as a function of operating variables of the internal combustion engine; and
   at active filter cleaning operation and upon the presence of the release condition, injecting fuel using the injector connected to the fuel tank via the fuel line, wherein the operating variables which are required to carry out the adaptation of the lambda regulation are recorded without being used for the lambda regulation, and at deactivated filter cleaning operation and presence of the release condition, the adaptation of the lambda regulation is carried out as a function of the recorded operating variables.

2. The method as recited in claim 1, wherein the release condition is present when the internal combustion engine is operated in a predetermined operating range.

3. The method as recited in claim 1, wherein after activation of the filter cleaning operation, carrying out an adaptation of the lambda regulation is suppressed for a predetermined waiting time when a change of operating point is recognized after the activation of the filter cleaning operation.

4. The method as recited in claim 1, wherein the operating variables which are recorded for the adaptation of the lambda regulation include: (i) the engine speed and/or the engine load, (ii) a measured lambda value, (iii) the setpoint lambda value, (iv) a specification about an air charge in the internal combustion engine, and (v) the supplied fuel quantity.

5. The method as recited in claim 1, wherein the at least one adaptation parameter is adapted as a function of the operating variables of the internal combustion engine to carry out an adaptation of the lambda regulation.

6. The method as recited in claim 1, wherein a loading factor of an activated carbon filter of the fuel tank ventilation is ascertained continuously or regularly during the filter cleaning operation from a deviation of a measured lambda value from the predefined setpoint lambda value, the loading factor being taken into consideration for correction of the fuel quantity to be supplied.

7. An engine control unit for operating an internal combustion engine, the engine control unit configured to:
   operate the internal combustion engine including a lambda regulation which sets a fuel quantity to be injected by an injector connected to a fuel tank via a fuel line in accordance with a predefined setpoint lambda value;
   at preset times, carry out a filter cleaning operation for a fuel tank ventilation;
   as a function of the presence of a release condition of the internal combustion engine, carry out an adaptation of the lambda regulation by adapting at least one adaptation parameter as a function of operating variables of the internal combustion engine;
   at active filter cleaning operation and upon the presence of the release condition, injecting fuel using the injector connected to the fuel tank via the fuel line, wherein the operating variables which are required to carry out the adaptation of the lambda regulation are recorded without being used for the lambda regulation, and at deactivated filter cleaning operation and presence of the release condition, the adaptation of the lambda regulation being carried out as a function of the recorded operating variables.

8. A non-transitory machine-readable storage medium on which is stored a computer program for operating an internal combustion engine, the computer program, when executed by a data processing device, causing the data processing device to perform the following steps:
   operating the internal combustion engine including a lambda regulation which sets a fuel quantity to be injected by an injector connected to a fuel tank via a fuel line in accordance with a predefined setpoint lambda value;
   at preset times, carrying out a filter cleaning operation for a fuel tank ventilation;
   as a function of the presence of a release condition of the internal combustion engine, carrying out an adaptation of the lambda regulation by adapting at least one adaptation parameter as a function of operating variables of the internal combustion engine; and
   at active filter cleaning operation and upon the presence of the release condition, injecting fuel using the injector connected to the fuel tank via the fuel line, wherein the operating variables which are required to carry out the adaptation of the lambda regulation are recorded without being used for the lambda regulation, and at deactivated filter cleaning operation and presence of the release condition, the adaptation of the lambda regulation is carried out as a function of the recorded operating variables.

* * * * *